United States Patent
Barnes

[15] 3,658,369
[45] Apr. 25, 1972

[54] LOCKING EQUIPMENT COUPLING PIN
[72] Inventor: David A. Barnes, Route 1, Box 2, Whitehouse, Tex. 75791
[22] Filed: July 6, 1971
[21] Appl. No.: 159,788

[52] U.S. Cl. ..................................287/52.08, 85/5 CP
[51] Int. Cl. ..................................................F16d 1/06
[58] Field of Search............287/52.08, DIG. 7; 85/5 CP, 85/8.3, 8.6, 8.8; 280/515

[56] References Cited

UNITED STATES PATENTS

| | | | |
|---|---|---|---|
| 2,514,594 | 7/1950 | Weiler | 280/515 |
| 2,589,482 | 3/1952 | Downey | 287/52.08 |
| 2,629,908 | 3/1953 | Keck | 287/DIG. 7 |
| 3,077,810 | 2/1963 | Heidbrink | 85/5 CP |
| 3,383,972 | 5/1968 | Jackson et al | 280/515 X |

Primary Examiner—Andrew V. Kundrat
Attorney—E. Hastings Ackley

[57] ABSTRACT

A coupling pin for securing a pair of members together, having a locking retaining ring for holding the pin in place against displacement. The pin has a head with a pivotally mounted retaining ring designed to secure the pin in place in a bar, rod or shaft in which it is positioned to prevent displacement of the pin therefrom, particularly for retaining equipment such as farm implements connected to tractor draw bars or the like. Positive locking means is provided to prevent accidental displacement of the retaining ring from locking position, and finger grips are provided for facilitating manipulation of the retaining ring by the operator for releasing the same from locking position.

8 Claims, 8 Drawing Figures

PATENTED APR 25 1972 3,658,369

INVENTOR.
David A. Barnes
BY
ATTORNEY

LOCKING EQUIPMENT COUPLING PIN

BACKGROUND OF THE INVENTION

This invention relates to new and useful improvements in coupling pins, having positive retaining or locking rings connected therewith for holding the pins in operative position.

So-called "tractor equipment pins" commonly in use consist of a hardened metal pin having an enlarged head with a spring detent retaining ring swingably secured thereto. The pin or coupling member is used for detachably interlocking a pair of cooperable members such as a farm implement to a tractor draw bars and the like. The retaining rings of the tractor equipment pins now in use are easily swung to a retaining position, but are as easily swung out of such retaining position upon encountering brush, vines or other material, which will swing the pin away from the retaining position leaving the pin free to drop out of the hole in the draw bar or to be shaken out of such hole without notice by the operator, which results in freeing the equipment formerly coupled together for damage or loss.

SUMMARY OF THE INVENTION

The locking coupling pin of this invention comprises a hardened metal cylindrical body or shank having a rectangular head at one end provided with a transverse opening through which the opposite over lapping free ends of a retaining locking ring are slidable. Locking recesses are formed on the opposite sides of the head communicating with the transverse opening, which receive outturned or locking ends on the ring and which are of sufficient depth to prevent accidental twisting or turning of the outturned ends out of such recesses and so hold the retaining ring in locking position. Finger grips are provided for facilitating disengagement of the outturned ends or locking lugs on the ring from the recesses in the head of the pin.

It is a particular object of the invention to provide a linch pin for coupling two cooperable members together, which is provided with a retaining or locking ring for positively holding the pin in place coupling the members together, and which has means for positively preventing accidental disengagement of the locking ends or lugs of the ring from locking recesses in the head of the pin and so preventing movement of the retaining ring from the locking position inadvertently or by accident.

A further object of the invention is to provide a coupling pin and locking ring of the character described, in which the locking ends or lugs on the ring are disengageable from the locking recesses in the head of the pin only by compressing the ring about its circumference to deform and contract the ring and move the retaining lugs or ends of the ring apart out of the recesses in the head of the coupling pin.

Still another object of the invention is to provide a coupling pin of the character set forth having a retaining ring with finger grip means for facilitating the squeezing or compressing of the retaining ring by the user to permit ready disengagement of the locking ends of the rings from the locking recesses in the head of the coupling pin.

A further object of the invention is to provide a coupling pin and retaining ring of the character set forth which is interchangeable with presently or commonly used coupling pins or linch pins.

Another object of the invention is to provide a pin which is simple and economical to manufacture, of low cost, and which may be quickly and easily used by the operator.

A further important object of the invention is to provide a coupling pin and locking ring assembly of the character described in which the locking action of the retaining ring is positive to substantially eliminate any inadvertent or accidental disengagement of the ring from locking position.

BRIEF DESCRIPTION OF THE DRAWINGS

Additional objects and advantages of the invention will be readily apparent from the reading of the following description of a device constructed in accordance with the invention, and reference to the accompanying drawings thereof, wherein.

DESCRIPTION OF THE PREFERRED EMBODIMENTS

Figure 1:
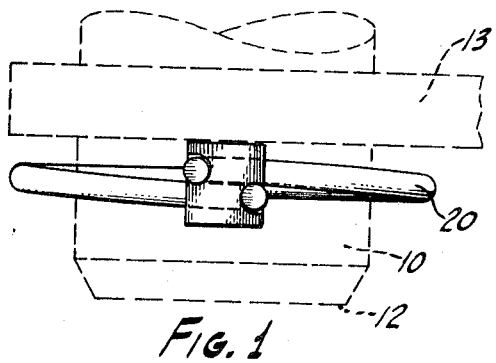
FIG. 1 is a view of the coupling pin and locking ring looking at the head end of the pin in position on a draw-bar holding an instrument connecting strap in place thereon.

In the drawings, FIGS. 1 through 5, is shown one form of my invention. A draw bar or shaft 10 of a tractor hitch mechanism (shown in dotted lines in FIG. 1) has a diametrically extending aperture 11 therethrough spaced inwardly from the end 12 of the bar, and a coupling pin 15, designated generally by the numeral 15, is shown as disposed in the transverse hole 11 and secured on the shaft 10 against displacement therefrom by a retaining ring or locking ring 20. A hitch strap 13, also shown in dotted lines in FIG. 1, is secured on the shaft 10 by the coupling pin 15 against displacement outwardly from the end of the draw bar. The connector pin 15 provides means for releasably interlocking the draw bar or shaft 10 to the connector strap 13 of the farm equipment, or other equipment, in the well known manner, and this form of the locking coupling pin is designed to positively retain such mechanism on the draw bar or shaft against displacement therefrom.

Figure 5:
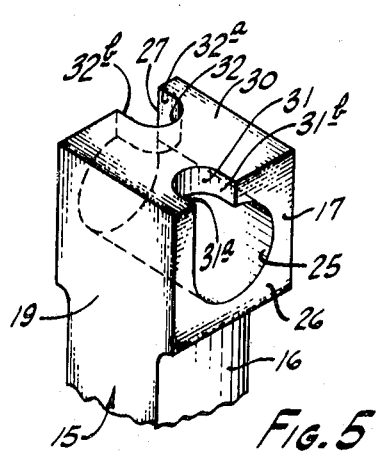
FIG. 5 is an enlarged fragmentary isometric view of the head of the locking pin of FIG. 1.

The connector or coupling pin 15 is in the form of an elongate substantially cylindrical shank portion 16 having a rectangular head member 17 at one end and beveled guide point 18 at the opposite end. Also, if desired, the pin may be flattened along one side of the cylindrical body portion 16 coextensive with one of the planar surfaces of the rectangular head member, as shown in FIG. 5, to provide an elongate planar bearing surface 19 which is adapted to abut the connector strap 13, or the like, to provide a uniform equal engagement between the coupling pin 15 and the strap or other member 13 secured on the draw bar, rod or shaft 10.

The retaining or locking ring 20 is a split resilient ring having its opposite free end portions 21 and 22 disposed in overlapping helical side by side array and extending through a cylindrical aperture or opening 25 in the head 17 of the pin 15. The longitudinal axis of the opening 25 lies parallel to the planar surface 19 and extends from one planar side 26 of the head to the opposite planar side 27 thereof substantially centrally of such opposed planar faces of the rectangular head. The opposite end portions 21 and 22 of the retaining or locking ring 20 are formed with outwardly turned lugs or ears 28 and 29 disposed at approximately radially at a ninety degree angle to the longitudinal axis of the end portions adjacent their ends to form locking lugs or bends and these locking lugs or bends are arranged to engage in locking recesses 31 and 32 formed in the opposed planar faces 26 and 27, respectively, of the head. As clearly shown in FIGS. 4 and 5, the recesses 31 and 32 extend to the outer end surface 30 of the rectangular head and are disposed to opposite sides of a line parallel to the longitudinal axis of the opening 25, so that when the ends of the retaining or locking ring 20 are disposed in the opening 25 the upturned or outturned locking lugs 28 and 29 will engage in the openings 31 and 32, respectively. The recesses 31 and 32 are so offset because the diameter of the ring 25 is slightly greater than twice the diameter of the cylindrical spring wire of which the locking ring 20 is formed, and the end portion 21 of the locking ring is disposed on the side of the opening 25 adjacent the planar bearing surface 1i of the connector pin, in position for the lug 28 to engage in the recess 31, while the end portion 22 of the ring is disposed in the opposite half of the opening 25 in position for the outwardly turned locking lug 29 to engage in the recess 32, as is clearly shown in FIG. 1.

The depth of the locking recesses 31 and 32 is substantially equal to the diameter of the spring wire of which the locking ring is made, so that when the lugs 28 and 29 are engaged in the locking recesses there is no tendency for the lugs to spring outwardly or to be cammed outwardly from within the recesses. Instead, the parallel sides 31a and 31b of the recess 31 and the parallel sides 32a and 32b of the recess 32 extend substantially parallel to each other and parallel to the axis of the opening 25, so that there is no camming or wedge action on the locking lugs 28 and 29 of the retaining ring.

In relaxed condition, the retainer ring 20 has a diameter greater than the diameter of the ring when the lugs 28 and 29 are engaged in the locking recesses 31 and 32, so that the resiliency of the locking ring when so contracted positively holds the lugs in the locking recesses. The length of the lugs 28 and 29 is such that they cannot be moved out of the locking recesses 31 and 32 if the ring is collapsed or flexed toward the cylindrical shank portion 16 of the pin while the lugs are engaged in the locking recesses. As a matter of fact, the curvature and size of the opening 25 is such that the rings cannot move any substantial distance longitudinally of the coupler pin while both overlapping end portions of the rings are disposed in the opening. Thus, the locking lug portions of the rings are always normally resiliently held in positive locking engagement in the recesses 31 and 32 in the head 17 of the coupling pin 15.

Figure 2:
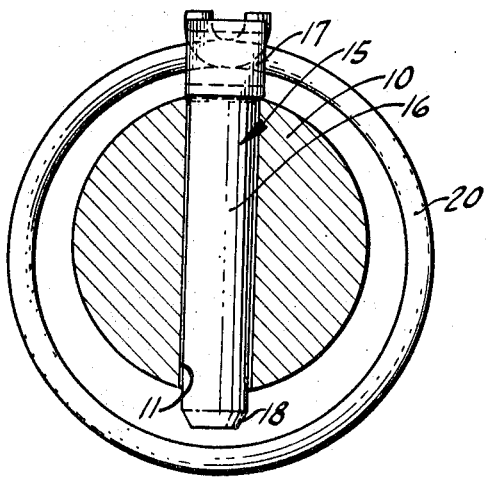
FIG. 2 is a view, partly in elevation and partly in section, of the coupling pin and locking ring of FIG. 1 showing the same in the locking position on the draw bar or shaft.
Figure 3:
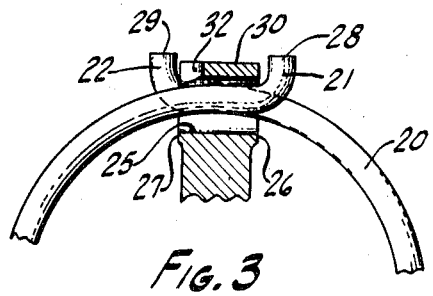
FIG. 3 is a fragmentary view, partly in elevation and partly in section, of the upper end of the coupling pin and locking ring of FIG. 2, showing the ring compressed to free the locking lug ends of the ring from the locking recesses in the head of the pin for swinging movement of the ring from locked retaining position.
Figure 4:
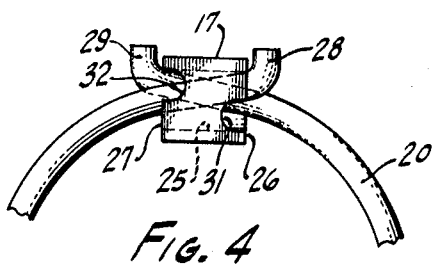
FIG. 4 is a view similar to FIG. 1, showing the retaining or locking ring swung approximately ninety degrees to a position freeing the pin for movement out of the draw bar or shaft.

When it is desired to release the securing or retaining ring 20 from the retaining position shown in FIG. 2, the outer periphery of the retaining ring 20 is pressed inwardly toward the bar 10 to reduce the diameter of the ring slightly and so move the ends of the rings in the opening 25 to separate the locking lugs 28 and 29 and displace them from their position in the locking recesses 31 and 32, respectively, as shown in FIG. 3. This is done by compressing the ring on opposite sides of the coupling pin until the locking lugs are moved out of the locking recesses. When the locking lugs 28 and 29 are disengaged from the locking recesses, the ring 20 may be swung about the axis of the opening 25 until the lugs 28 and 19 are engaged with the opposed planar faces 26 and 27 of the head 17, as shown in FIG. 4. The coupling pin may then be lifted from the opening or hole 11 in the draw bar or shaft 10 and the connector strap 13 or other equipment slid off the draw bar. Thereupon, the pin may be reinserted in the opening or hole 11 and the retaining or locking ring 20 swung about the axis of the opening 25 to again position the lugs in the locking recesses 31 and 32 in the position shown in FIGS. 1 and 2, so that the oin is again positively locked in place on the draw bar or shaft 10. Since the lugs 28 and 29 are disposed sufficiently within the locking recesses 31 and 32 to prevent swinging movement of the locking ring 20 about the axis of the opening 25, the ring will be positively held in locking position against inadvertent, accidental or unintentional disengagement of the ring from such locking position, and the coupling pin will be retained in place on the draw bar or shaft 10. The only manner in which the retaining or locking ring 20 may be swung about the axis of the opening 25 is by first compressing the ring to reduce the diameter thereof and move the locking lugs 28 and 29 apart and out of their respective locking recesses 31 and 32, as shown in FIG. 3, whereupon the ring may be swung to the position shown in FIG. 4 for releasing the coupling pin from the shaft or draw bar.

From the foregoing, it will be seen that a positive lock for the locking ring 20 for retaining the coupling pin in place on the draw bar or shaft has been provided, and that inadvertent release is prevented by the locking engagement of the lugs in the locking recesses in the head of the coupling pin.

It will also be seen that the device is simple, being formed of only two pieces and easily machined and easily operated. Furthermore, the device is positive in its action and is designed to prevent loss of the pin or breakage of farm equipment coupled to the draw bar of a tractor by means of the pin. Also, the bearing surface 19 provides a full bearing surface against the connector strap 13 of the equipment held in place on the shaft or draw bar 10.

Figure 6:
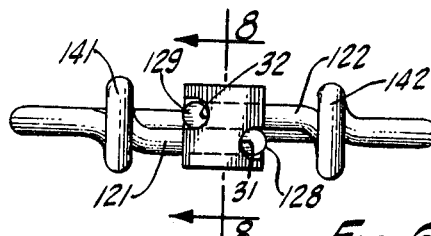
FIG. 6 is a view, similar to FIG. 1, of a slightly modified form of coupling pin and locking ring.
Figure 7:
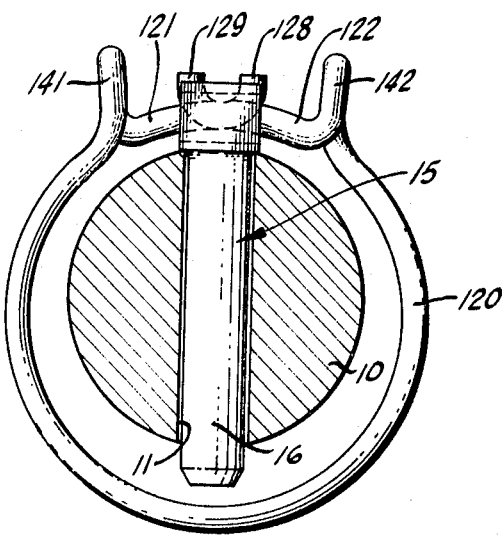
FIG. 7 is a view similar to FIG. 2 showing the modified form of the coupling pin and locking ring in place in a bar or shaft in locking position; and, FIG. 8 is a fragmentary view, partly in elevation and partly in section, taken on the line 8 — 8 of FIG. 6, showing upper end of the coupling member and ring.
Figure 8:
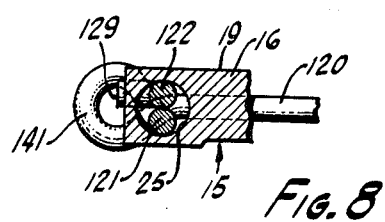

A slightly modified form of the locking coupling pin member is shown in FIGS. 6, 7 and 8. In this form of the device, the pin 15 is identical to that of the form first described, having the substantially cylindrical shank portion 16 and the rectangular head 17 identical to the head illustrated in FIG. 5. The locking ring 120, however, has finger grip means 141 and 142 formed thereon spaced from the locking lugs or ears 128 and 129, respectively, by means of which the user of the locking coupling pin may more readily contract the locking ring 120 to reduce the diameter thereof and move the locking lugs 128 and 129 out of the corresponding locking recesses 31 and 32 in the head. As will be seen in the drawings, the finger grips 141 and 142 are formed substantially in the shape of rings lying in a plane perpendicular to the free end portions 121 and 122 of the ring on which the locking ears or lugs 128 and 129 are formed. The wire of each of the grips is bent in a circular shape having its center in substantial alignment with the free end portions 121 and 122 of the ring so that pressure applied to the circular grips 141 and 142 will be transmitted along the longitudinal axis of the cylindrical wire forming the free end portions of the ring extending through the opening 25 in the head 17 of the pin. The compressive force exerted on the grips 141 and 142 permit the user to more easily compress or contract the ring to reduce its diameter and move the lugs or ears 128 and 129 out of the locking recesses 31 and 32, respectively, in which they are held when in locked position. The relaxed diameter of the ring 120 is greater than the diameter when the rings are engaged in the opening 25 in the head of the coupling pin and the lugs 128 and 129 are disposed in the locking recesses. As clearly shown in FIG. 8, the free end portions 121 and 122 of the ring extend through the opening 25 in the head of the coupling pin with the grips or finger pieces 141 and 142 disposed on the opposite sides of the head in position to be readily grasped by the user of the device for flexing the ring to compress and contract the same to move the locking lugs apart and out of the locking recesses in the head.

All other features of the locking ring 120 are identical to that of the ring 20 first described, except the finger piece or gripping members 141 and 142 by means of which the ring may be more readily contracted for releasing the locking lugs from the locking recesses to permit turning the ring to release the coupling pin from the opening or hole 11 in the shaft or draw bar 10.

As is readily apparent, the locking lugs or ears 28 and 29 of FIGS. 1 through 4, and the locking lugs or ears 128 and 129 of FIGS. 6 through 8 provide means for preventing the free ends of the rings 20 and 120, respectively, from being displaced or pulled through the opening 25 in the head of the coupling pin. As will be clearly seen in FIG. 8, the lugs are sufficiently long and the diameter of the opening 25 is sufficiently small to prevent the free ends of the ring from being pulled or otherwise moved through the opening, and the rings 20 and 120 are therefore positively connected to the coupling pin at all times after formation of the lugs on the rings with the free ends of the rings disposed in the opening 25 in the head of the coupling pin. Thus, the rings will not be disconnected from the coupling pin and lost, and the locking ring is always available for holding the coupling pin in coupling position in the bar or rod 10.

This form of the device has all the advantages of the form first described with the additional advantage of the gripping or finger pieces on the ring to facilitate the contraction of the ring as aforesaid.

The foregoing description of the invention is explanatory only, and changes in the details of the constructions illustrated may be made by those skilled in the art, within the scope of the appended claims, without departing from the spirit of the invention.

What is claimed and desired to be secured by Letters Patent is:

1. A locking linch pin for detachably coupling one member to another member having a hole therethrough and comprising: an elongate pin member having a shank and an enlarged head having opposed parallel planar side surfaces; means providing an opening substantially centrally of the head and extending from one planar side thereof to the opposite planar side perpendicular to the longitudinal axis of the pin member; a resilient locking ring member having a substantially circular shape and having free ends overlapping in substantial helical array extending through the opening in the head of the pin member; outwardly directed lug members on the free ends of the ring extending substantially radially of the ring member; locking recess means in the head extending inwardly from the planar surfaces through which the axial opening opens so as to intersect said opening and disposed to receive the radially projecting locking lugs ends of the locking ring when the ring is disposed to retain the pin in place in the hole in the member in which it is disposed, said ring extending around the member having the hole and being engageable with said member to prevent withdrawal of the shank portion of the pin from the hole.

2. A linch pin of the character set forth in claim 1, wherein: the locking ring member has a relaxed diameter greater than the diameter of the ring when the locking lugs are engaged in the locking recesses in the head of the pin; and the locking recesses in the opposed planar faces of the head of the pin member are deeper than the thickness of the locking lugs on the free ends of the ring, whereby said lugs are prevented from displacement from the recesses as a result of swinging movement about the axis of the free ends of said ring.

3. A linch pin of the character set forth in claim 1, wherein a planar bearing surface is formed along one side of the elongate pin member lying in a plane parallel to the axis of the opening through the head of the pin member and providing a bearing surface engageable by the means secured on the member having the hole therein.

4. A linch pin of the character set forth in claim 1, wherein the locking ring has finger pieces provided thereon adjacent and spaced from the locking lug members on the free ends of said ring and operable by the user of the device to contract the locking ring to move the locking lugs out of the recesses in the head, said finger pieces being spaced sufficiently from the head to permit such contracting movement of the free ends of the ring.

5. A linch pin and locking ring of the character set forth in claim 4, wherein the finger pieces are formed in circular configuration of the resilient material of which the ring is formed, and the plane of the rings of the finger pieces is perpendicular to the longitudinal axis of the free end portions of the locking ring.

6. A locking ring for use with a linch pin for securing the linch pin against displacement from a draw bar or shaft having a hole extending transversely therethrough including: an annular resilient ring member formed of elongate cylindrical spring wire having free end portions overlapping in substantially helical side-by-side array; the extreme ends of the free end portions of the ring being bent outwardly to extend substantially radially outwardly of the ring and provide locking lugs, said ring also being provided with finger pieces in the form of circular convolutions of said cylindrical spring wire formed to lie in a plane substantially perpendicular to the free end portions of the ring and spaced from the outturned lug ends of the ring a distance sufficient to permit contracting movement of the ring to move the lug ends thereof away from each other.

7. A pin member for a locking linch pin assembly including: a substantially cylindrical shank portion having a substantially rectangular head larger than the diameter of the cylindrical shank portion to provide a stop shoulder between the head and the shank portion; an opening extending from one planar surface of the head to the parallel planar surface of the head and disposed perpendicular to the longitudinal axis of a shank portion of the body; a locking recess formed in the end of the head extending inwardly from each of the parallel faces through which the opening extends toward the opposite face, intersecting said opening and having parallel sides substantially parallel to the longitudinal axis of the opening.

8. A linch pin member of the character set forth in claim 7 including: a planar bearing surface along one longitudinal side of said shank portion forming a continuation on one planar side of said head parallel to the longitudinal axis of the opening in the head.

* * * * *